(12) United States Patent
Herr et al.

(10) Patent No.: US 8,408,877 B2
(45) Date of Patent: *Apr. 2, 2013

(54) WIND TURBINE BLADES WITH TWISTED TIPS

(75) Inventors: Stefan Herr, Greenville, SC (US);
Kevin R. Kirtley, Simpsonville, SC (US); Kevin W. Kinzie, Moore, SC (US); Brandon S. Gerber, Ware Shoals, SC (US); Kevin J. Standish, Simpsonville, SC (US); Benoit P. Petitjean, Greer, SC (US)

(73) Assignee: General Electric Company, Schenectady, NY (US)

( * ) Notice: Subject to any disclaimer, the term of this patent is extended or adjusted under 35 U.S.C. 154(b) by 1216 days.

This patent is subject to a terminal disclaimer.

(21) Appl. No.: 12/129,942

(22) Filed: May 30, 2008

(65) Prior Publication Data

US 2009/0297353 A1     Dec. 3, 2009

(51) Int. Cl.
*F04D 29/38* (2006.01)
(52) U.S. Cl. .................................. 416/223 R
(58) Field of Classification Search .................. 416/238
See application file for complete search history.

(56) References Cited

U.S. PATENT DOCUMENTS

| | | | | |
|---|---|---|---|---|
| 5,035,577 | A * | 7/1991 | Damongeot | 416/223 R |
| 7,794,209 | B2 * | 9/2010 | Wobben | 416/223 R |
| 8,061,996 | B2 * | 11/2011 | Herr et al. | 416/223 R |
| 2006/0002794 | A1 | 1/2006 | Moroz et al. | |
| 2006/0104812 | A1 * | 5/2006 | Kovalsky et al. | 416/87 |
| 2006/0216153 | A1 | 9/2006 | Wobben | |
| 2006/0239821 | A1 * | 10/2006 | McCabe | 416/197 A |
| 2009/0173834 | A1 * | 7/2009 | Prince et al. | 244/198 |

FOREIGN PATENT DOCUMENTS

| | | |
|---|---|---|
| EP | 1832744 | 12/2007 |
| WO | 2006133715 | 12/2006 |

OTHER PUBLICATIONS

"Design of Tapered and Twisted Blade for the NREL Combined Experiment Rotor", Publication No. NREL/SR-500-26173 (Apr. 1999).

* cited by examiner

*Primary Examiner* — Richard Edgar
(74) *Attorney, Agent, or Firm* — Dority & Manning, P.A.

(57) ABSTRACT

A blade for a wind turbine includes a total backward twist of between approximately 6 degrees and approximately 15 degrees between an outer approximately 1 percent to approximately 10 percent of a rotor radius of the blade.

14 Claims, 5 Drawing Sheets

WIND TURBINE BLADES WITH TWISTED TIPS

CROSS-REFERENCE TO RELATED APPLICATIONS

The subject matter disclosed here generally relates to that disclosed in U.S. patent application Ser. No. 12/129,966 for "Wind Turbine Blades with Twisted and Tapered Tips" and U.S. patent application Ser. No. 12/129,997 for "Wind Turbine Blade Planforms with Twisted and Tapered Tips," each of which is being filed concurrently with this application and is incorporated by reference here.

BACKGROUND OF THE INVENTION

1. Technical Field

The subject matter described here generally relates to fluid reaction surfaces with specific blade structures, and, more particularly, to wind turbines having blades with twisted tips.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

The blades 10 generate lift and capture momentum from moving air that is them imparted to a rotor as the blades spin in the "rotor plane." Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord."

The outboard ends of the blades 10 are called "tips" and the distance from the tip to the root, at the opposite end of the blade, is called the "span." Since the root of the blade 10 is displaced from the blade's center of rotation when it is connected to the hub, the distance from the center of rotation of the blade 10 to tip is referred to as the "rotor radius" and designated here with the letter "R." Since many blades 10 change their chord over the span (and corresponding rotor radius), the chord length is referred to as the "root chord," near the root, and the "tip chord," near the tip of the blade. The resulting shape of the blade 10, when viewed perpendicular to the direction of flow, is called the "platform." The thickness of a blade 10 varies across the planform, and the term "thickness" is typically used to describe the maximum distance between the low pressure suction surface and the high pressure surface on the opposite side of the blade for any particular chord line.

"Angle of attack" is a term that is used in to describe the angle between the chord line of the blade 10 and the vector representing the relative motion between the blade and the air. "Pitching" refers to rotating the angle of attack of the entire blade 10 into or out of the wind in order to control the rotational speed and/or absorption of power from the wind. For example, pitching the blade "towards feather" rotates of the leading edge of the blade 10 into the wind, while pitching the blades "towards stall" rotates the leading edge of the blade out of the wind Since the speed of the blades 10 relative to air increases along the span of the rotating blades, the shape of the blades is typically twisted in order to maintain a generally consistent angle of attack at most points along the span of the blade. For example, FIG. 2 illustrates a conventional blade twist distribution 20 showing the "twist" angle $\theta$ of the blades 10 in degrees on the vertical axis. The horizontal axis in FIG. 2 shows the normalized distance outward from the center of rotation of blade 10 along the hub and blade span, "r/R," referred to here as "percent of rotor radius." Due to the relatively small size of the hub as compared to the length of the blades 10, this "percent of rotor radius" may also be approximated as the normalized distance outward starting from the root of the blade, or "percent of span," rather than starting from the center of rotation of the blade.

Positive values of twist angle $\theta$ in these figures indicate that the blade 10 is twisted towards feather, while negative values indicate that the blade is twisted toward stall. The twist angle $\theta$ generally starts with a high positive (towards feather) value inboard and then "rotates" towards stall in the outboard direction along the span of the blade. This change is called "forward twist" of the blade. When the twist angle is rotated towards feather the change is called "backward twist." A zero value for twist angle $\theta$ indicates that portion of the blade $\theta$ will be in the rotor plane when the blade is arranged on the rotor 8 with zero pitch.

FIG. 3 is an enlarged portion of the twist distribution 20 shown in FIG. 2, where the entire blade 10 has also been pitched forward. Since FIG. 3 shows the twist distribution of an outer portion of the blade 10 near the tip, it is also referred to as a "tip twist distribution." FIG. 3 corresponds to the following numerical data:

| r/R | $\theta$ - 20 |
| --- | --- |
| 96.00% | −1.63 |
| 96.80% | −1.68 |
| 97.40% | −1.66 |
| 98.06% | −1.62 |
| 98.56% | −1.54 |
| 99.06% | −1.35 |
| 99.56% | −0.58 |
| 100.00% | 1.67 |

However, other tip twist distributions have also been published. For example, "Design of Tapered and Twisted Blade for the NREL Combined Experiment Rotor," Publication No. NREL/SR-500-26173 (April 1999) illustrates a twist distribution which is negative from about 75% of span to the blade tip.

The noise and power performance of wind turbine blades 10 depends, in part, upon vortex development at the tip of the blade. Various techniques have been proposed to control this vortex development. For example, commonly-owned co-pending U.S. application Ser. No. 11/827,532 filed on Jul. 12, 2007 discloses a wind turbine blade having a vortex breaking system for reducing noise. While vortex development can generally be reduced by minimizing the aerodynamic load at the tip of the blade, so-called "tip unloading" typically causes a significant reduction in power that is produced by the blade.

BRIEF DESCRIPTION OF THE INVENTION

These and other drawbacks associated with such conventional approaches are addressed here in by providing, in various embodiments, a blade for a wind turbine including a total backward twist of between approximately 6 and approximately 15 degrees between an outer approximately 1 to approximately 10 percent of a rotor radius of the blade.

BRIEF DESCRIPTION OF THE DRAWINGS

Various aspects of this technology will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
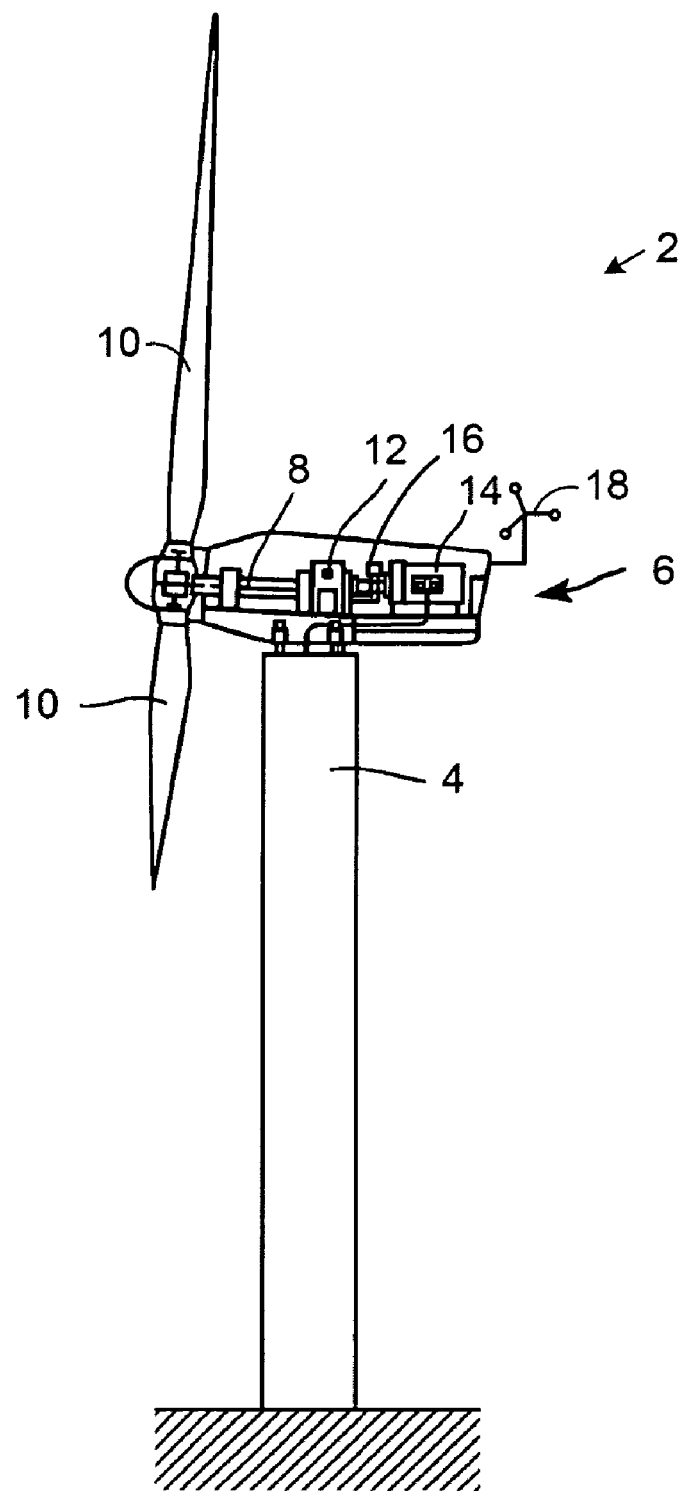
FIG. 1 is a schematic side view of a conventional wind generator.
Figure 2:
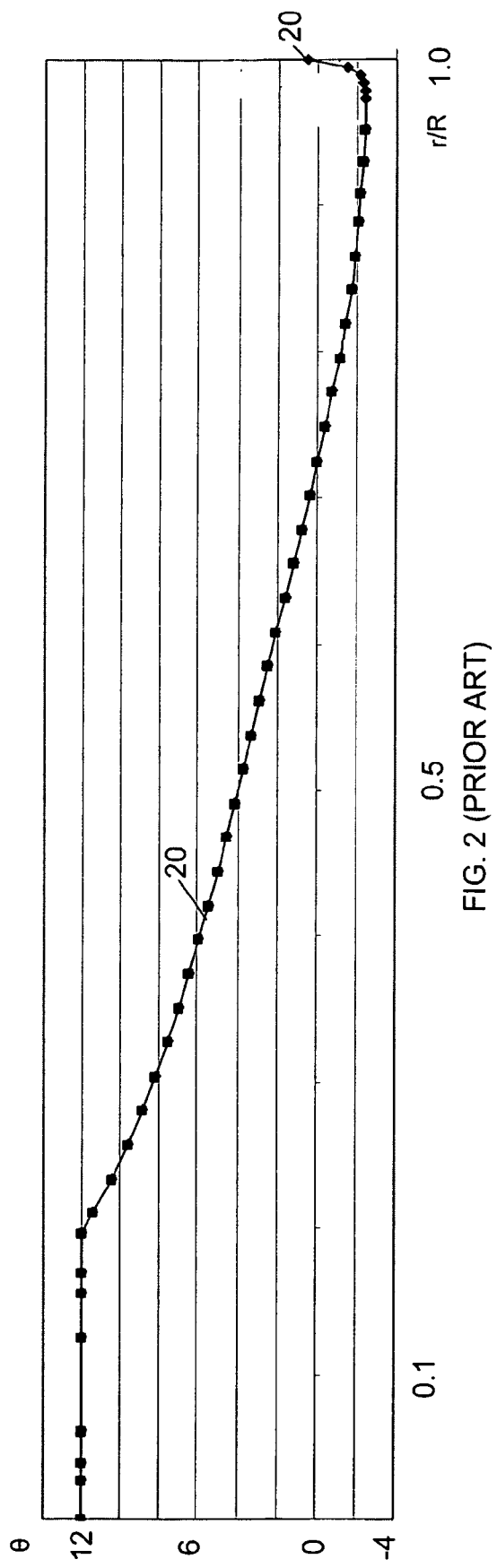
FIG. 2 is a chart illustrating a conventional twist distribution for the blade shown in FIG. 1.
Figure 3:
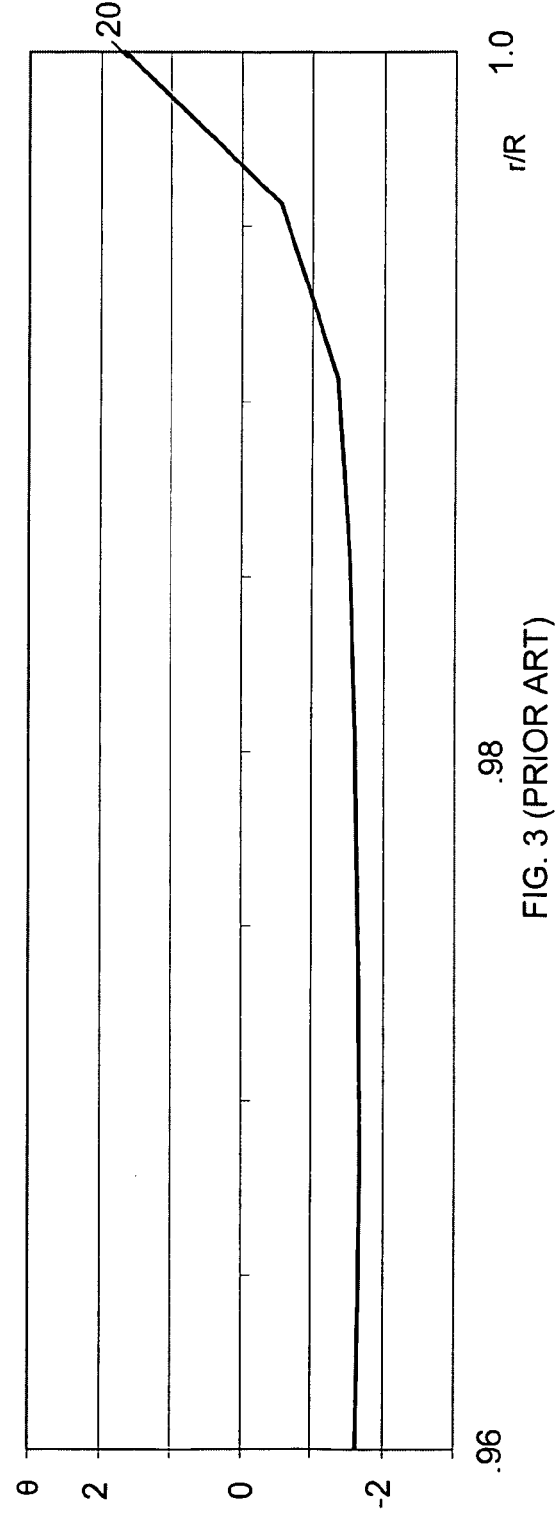
FIG. 3 is a chart illustrating the conventional tip twist distribution from FIG. 2.
Figure 4:
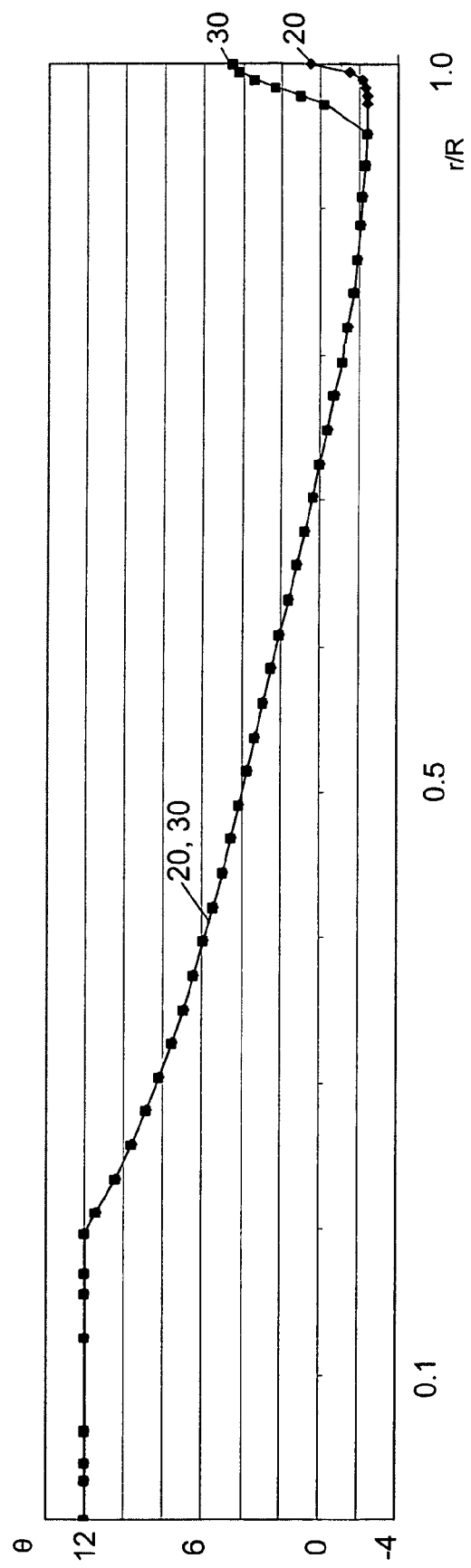
FIG. 4 a chart illustrating the conventional blade twist distribution from FIG. 2 and another blade twist distribution.

FIG. 4 is a chart illustrating the conventional blade twist distribution 20 from FIG. 2 along with another blade twist distribution 30. The blade twist distributions 20 and 30 are the same except for in the outer portion of the blade rotor radius near the tip of the blade 10 where the illustrated twist distribution 30 generally corresponds to the following numerical data:

| r/R | θ - 30 |
|---|---|
| 0.952128 | −2.40979 |
| 0.973404 | −0.28983 |
| 0.978723 | 0.999573 |

-continued

| r/R | θ - 30 |
|---|---|
| 0.984043 | 2.292061 |
| 0.989362 | 3.421259 |
| 0.994681 | 4.220788 |
| 1 | 4.52427 |

In comparison to the conventional twist distribution 20, the outer portion of the distribution 30 includes a larger total backward tip twist than the corresponding portion of the conventional twist distribution 20. The tip twist portion of the distribution 30 may also be used with other blades, including blades having other inboard twist distributions. The twist distribution 30 may also be pitched.

Figure 5:
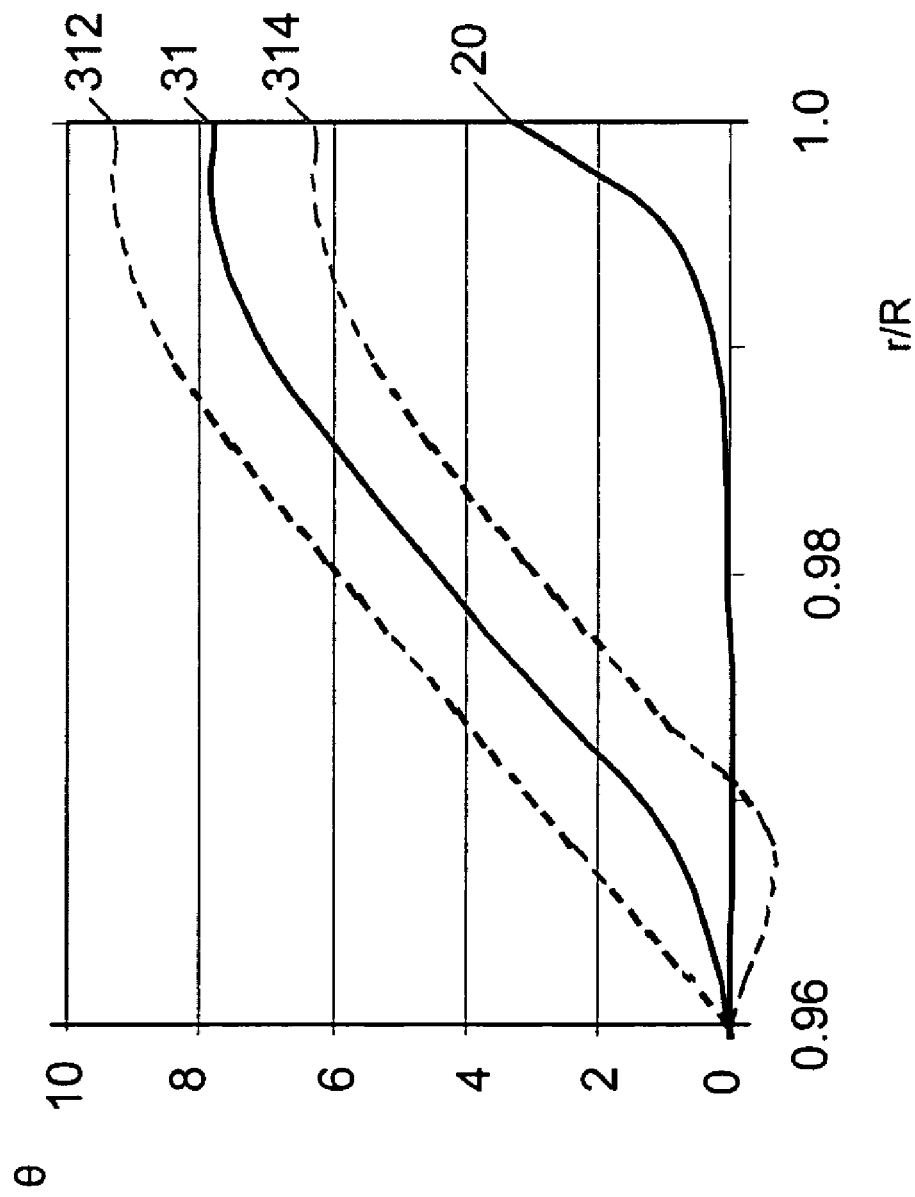
FIG. 5 is a chart illustrating another blade tip twist distribution and tolerance range along with the conventional tip twist distribution from FIG. 3.

The outer tip twist portion of the twist distribution 30 may also take a variety of other forms. For example, FIG. 5 illustrates the conventional tip twist distribution 20 along with another tip twist distribution 31 where the blades 10 have been pitched so that the twist at 0.96 r/R normalized rotor radius (about 96% of total span) is arranged in the rotor plane corresponding to zero degrees twist. Dashed lines 312 and 314 in FIG. 5 further illustrate upper and lower tolerance bands of approximately ±1.5 degrees twist for most of the tip portion of twist distribution 31. The twist distribution 31 and tolerance bands 312 and 314 shown in FIG. 5 correspond to the following numerical data:

| r/R | θ - 31 | θ - 312 | θ - 314 |
|---|---|---|---|
| 0.96 | 0 | 0 | 0 |
| 0.968 | 0.865823127 | 2.365823127 | −0.63418 |
| 0.974 | 2.622128497 | 4.122128497 | 1.122128 |
| 0.98064 | 4.613066853 | 6.113066853 | 3.113067 |
| 0.98564 | 6.032056696 | 7.532056696 | 4.532057 |
| 0.99064 | 7.160486604 | 8.660486604 | 5.660487 |
| 0.99564 | 7.798481894 | 9.298481894 | 6.298482 |
| 1 | 7.798481894 | 9.298481894 | 6.298482 |

In FIG. 5, the upper and lower tolerance limits 312 and 314 are illustrated as converging upon the actual twist distribution at 96 percent of rotor radius, where the twist tolerance band may or may not be different for other portions of the blade. However, the upper and lower tolerance limits 312 and 314 are not required to converge with each other or twist distribution 31 as shown in FIG. 5. Furthermore, other tolerance rages may also be used including as large as ±3 degrees, ±2 degrees, and as small as ±degree, ±0.75 degrees, ±0.5 degrees, ±0.25 degrees, and/or combinations thereof. These and other suitable tolerance ranges may also be expressed in terms of normalized and actual span, and/or normalized and actual percentage of twist.

Figure 6:
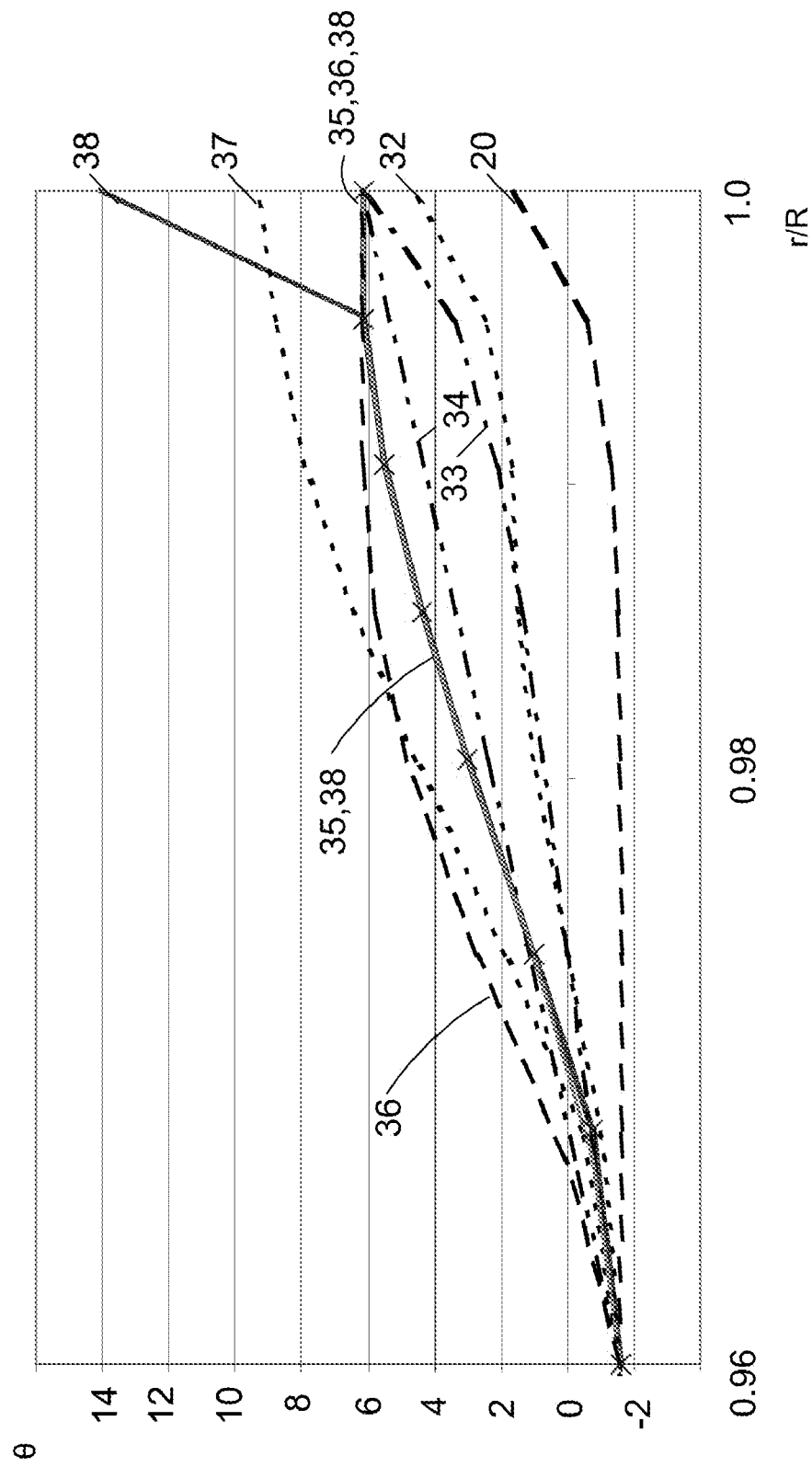
FIG. 6 is a chart illustrating various other blade tip twist distributions.

FIG. 6 illustrates several other configurations for the outer portion of the twist distribution 30 along with the conventional tip twist distribution 20 which correspond to the following numerical data:

| r/R | θ - 20 | θ - 32 | θ - 33 | θ - 34 | θ - 35 | θ - 36 | θ - 37 | θ - 38 |
|---|---|---|---|---|---|---|---|---|
| 96.00% | −1.63 | −1.63 | −1.63 | −1.63 | −1.63 | −1.63 | −1.63 | −1.63 |
| 96.70% | −1.68 | −1.15 | −0.84 | −0.26 | −0.76 | 0.06 | −0.47 | −0.76 |
| 97.40% | −1.66 | 0.00 | 0.00 | 1.10 | 0.99 | 2.73 | 1.87 | 0.99 |
| 98.06% | −1.62 | 1.01 | 0.71 | 2.40 | 2.98 | 4.84 | 4.52 | 2.98 |
| 98.56% | −1.54 | 1.46 | 1.34 | 3.37 | 4.40 | 5.80 | 6.41 | 4.40 |

-continued

| r/R | θ-20 | θ-32 | θ-33 | θ-34 | θ-35 | θ-36 | θ-37 | θ-38 |
|---|---|---|---|---|---|---|---|---|
| 99.06% | −1.35 | 1.65 | 2.10 | 4.35 | 5.53 | 6.17 | 7.92 | 5.53 |
| 99.56% | −0.58 | 2.43 | 3.43 | 5.32 | 6.17 | 6.17 | 8.77 | 6.17 |
| 100.00% | 1.67 | 4.67 | 6.17 | 6.17 | 6.17 | 6.17 | 9.30 | 14.00 |

It will be apparent from this data and FIG. 6 that several of the tip twist distributions overlap. For example, tip twist distributions 35 and 38 include the same data for r/R less than 99.56 percent.

The tip twist distributions 32 through 38 in FIG. 6 have a total backward twist of between approximately six and fifteen degrees. For example, the total backward twist of the distribution 32 is approximately 6.30 degrees while the total backward twist of distribution 38 is approximately 15.63 degrees. However, these and other suitable tip twist distributions may be provided with a total backward twist of between approximately six and ten degrees. The tip twist distributions shown in FIG. 6 occur over the outer 4 percent of the blade rotor radius. However, these and other suitable tip twist distributions may be arranged between an outer one to ten percent of the blade rotor radius, or between an outer one to five percent of the blade rotor radius.

In each of the embodiments illustrated in FIG. 6, the twist angle θ increases over at least a portion of the outer portion of the rotor radius as indicated by the slope of the tip twist distribution lines. For example, the slope of the tip twist distribution, or "twist rate" (or "rate of twist", or "twist velocity") indicated by the change in twist angle θ relative to percent of rotor radius r/R, for tip twist distribution 34 is substantially constant. However, the tip twist distribution may also be curved as indicated by the curvature of the tip twist distribution lines with a twist rate that increases and/or decreases over some or all of the outer portion of the rotor radius. For example, the twist rate of the tip twist distribution 32 is increasing in an outboard portion of the illustrated distribution, while the twist rate of tip twist distribution is decreasing in an outboard portion of the distribution. The twist rate of the tip twist distribution 35 increases in an inboard portion of the distribution, and then decreases in an outboard portion of the distribution. This changing slope of the tip twist distribution, the curvature of the twist distribution, or "twist acceleration" may also increase and/or decrease over these and other suitable tip twist distributions.

In each of the embodiments illustrated in FIG. 6, the twist angle θ increases over at least a portion of the outer portion of the rotor radius as indicated by the slope of the tip twist distribution lines. For example, the slope of the tip twist distribution, or "twist rate" (or "rate of twist," or "twist velocity") indicated by the change in twist angle θ relative to percent of rotor radius r/R, for tip twist distribution 34 is substantially constant. However, the tip twist distribution may also be curved, with a twist rate slope that increases and/or decreases over some or all of the outer portion of the span. For example, the twist rate of the tip twist distribution 32 is increasing in an outboard portion of the illustrated distribution, while the twist rate of tip twist distribution 36 is decreasing in an outboard portion of the distribution. The twist rate of the tip twist distribution 35 increases in an inboard portion of the distribution, and then decreases in an outboard portion of the distribution. This changing slope of the tip twist distribution, or "twist acceleration," may also increase and/or decrease over these and other suitable tip twist distributions.

The various tip twist distributions discussed above offer high blade power performance, low tip related noise, and less sensitivity to turbulence. While typical backward twist distributions provide almost all unloading at the very tip of the blade 10, many of the tip twist distributions discussed above unload the blade slightly inboard of the tip with little or no twist change at the very tip of the blade. Beneficial unloading of the blade 10 at its outboard end results in increased power performance and lower noise. The tip twist distributions disclosed here also provide an optimum balance between a sharp drop in aerodynamic loading at the very end of the blade, which tends to produce a noisy tip vortex, and a more-gradual reduction of the blade load, which leads to suboptimal power performance over large portions of the blade. Furthermore, the tip twist distributions disclosed here maintain a relatively large chord over a longer portion of the blade in order to provide higher power performance and less sensitivity to changes in the wind inflow velocity. Such higher solidity tip shapes also enable higher precision manufacturing of blades that are less aerodynamically sensitive to physically constant contour deviations, with more room for drainage holes and lightning protection at the blade tip.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:
1. A blade for a wind turbine, comprising:
   a total backward twist of between approximately 6 and approximately 15 degrees between an outer approximately 1 percent to approximately 10 percent of a rotor radius of the blade;
   wherein the total backward twist is between approximately 6 and approximately 10 degrees between the outer approximately 1 percent to approximately 10 percent of the blade rotor radius; and
   wherein the total backward twist is between approximately 6 degrees and approximately 10 degrees between the outer approximately 1 percent to approximately 5 percent of the blade rotor radius;
   having the following tip twist distribution

| r/R | θ |
|---|---|
| .960 | −1.63 |
| .967 | −0.76 |
| .974 | 0.99 |
| .981 | 2.98 |
| .986 | 4.40 |
| .991 | 5.53 |
| .996 | 6.17 | wherein "r/R" is an approximate normalized distance outward from a center of rotation of blade along the blade span, and θ is an approximate angle of the twist in degrees.

2. The blade recited in claim 1 wherein the tip twist distribution further comprises θ value of between approximately 6.17 degrees and approximately 14.0 degrees at an r/R value of between approximately 0.996 and approximately 1.0.

3. The blade recited in claim 2, wherein a rate of change of the backward twist relative to the percent of the blade rotor radius increases over at least a portion of the outer approximately 1 percent to approximately 10 percent of the blade rotor radius.

4. The blade recited in 1, the tip twist distribution further comprises θ value of between approximately 6.17 degrees and approximately 14.0 degrees at and r/R value of approximately 1.0.

5. The blade recited in claim 1, wherein a rate of change of the backward twist relative to the percent of the blade rotor radius is substantially constant over the outer approximately 1 percent to approximately 10 percent of the blade rotor radius.

6. The blade recited in claim 1, wherein a rate of change of the backward twist relative to the percent of the blade rotor radius increases over at least a portion of the outer approximately 1 percent to approximately 10 percent of the blade rotor radius.

7. The blade recited in claim 1, wherein a rate of change of the backward twist relative to the percent of the blade rotor radius is substantially constant over the outer approximately 1 percent to approximately 5 percent of the blade rotor radius.

8. The blade recited in claim 1, wherein a rate of change of the backward twist relative to the percent of the blade rotor radius increases over at least a portion of the outer approximately 1 percent to approximately 5 percent of the blade rotor radius.

9. The blade recited in claim 8, wherein a rate of change of the backward twist relative to the percent of the blade rotor radius decreases over another portion of the outer approximately 1 percent to approximately 5 percent of the blade rotor radius.

10. A blade for a wind turbine, comprising:
a total backward twist of between approximately 6 and approximately 15 degrees between an outer approximately 1 percent to approximately 10 percent of a rotor radius of the blade; and
wherein a rate of change of the backward twist relative to the percent of the blade rotor radius decreases over at least a portion of the outer approximately 1 percent to approximately 10 percent of the blade rotor radius.

11. A blade for a wind turbine, comprising:
a total backward twist of between approximately 6 and approximately 15 degrees between an outer approximately 1 percent to approximately 10 percent of a rotor radius of the blade;
wherein a rate of change of the backward twist relative to the percent of the blade rotor radius increases over at least a portion of the outer approximately 1 percent to approximately 10 percent of the blade rotor radius; and
wherein a rate of change of the backward twist relative to the percent of the blade rotor radius decreases over another portion of the outer approximately 1 percent to approximately 10 percent of the blade rotor radius.

12. A blade for a wind turbine, comprising:
a total backward twist of between approximately 6 and approximately 15 degrees between an outer approximately 1 percent to approximately 10 percent of a rotor radius of the blade;
wherein the total backward twist is between approximately 6 and approximately 10 degrees between the outer approximately 1 percent to approximately 10 percent of the blade rotor radius; and
wherein a rate of change of the backward twist relative to the percent of the blade rotor radius decreases over at least a portion of the outer approximately 1 percent to approximately 10 percent of the blade rotor radius.

13. A blade for a wind turbine, comprising:
a total backward twist of between approximately 6 and approximately 15 degrees between an outer approximately 1 percent to approximately 10 percent of a rotor radius of the blade;
wherein the total backward twist is between approximately 6 and approximately 10 degrees between the outer approximately 1 percent to approximately 10 percent of the blade rotor radius;
wherein a rate of change of the backward twist relative to the percent of the blade rotor radius increases over at least a portion of the outer approximately 1 percent to approximately 10 percent of the blade rotor radius; and
wherein a rate of change of the backward twist relative to the percent of the blade rotor radius decreases over another portion of the outer approximately 1 percent to approximately 10 percent of the blade rotor radius.

14. A blade for a wind turbine, comprising:
a total backward twist of between approximately 6 and approximately 15 degrees between an outer approximately 1 percent to approximately 10 percent of a rotor radius of the blade;
wherein the total backward twist is between approximately 6 and approximately 10 degrees between the outer approximately 1 percent to approximately 10 percent of the blade rotor radius;
wherein the total backward twist is between approximately 6 and approximately 10 degrees between the outer approximately 1 percent to approximately 5 percent of the blade rotor radius; and
wherein a rate of change of the backward twist relative to the percent of the blade rotor radius decreases over at least a portion of the outer approximately 1 percent to approximately 5 percent of the blade rotor radius.

* * * * *